(12) United States Patent
Lien et al.

(10) Patent No.: US 8,363,382 B2
(45) Date of Patent: Jan. 29, 2013

(54) STRUCTURE OF MULTILAYER CERAMIC DEVICE

(75) Inventors: Ching-Hohn Lien, Taipei (TW); Hong-Zong Xu, Guishan Shiang (TW)

(73) Assignee: SFI Electronics Technology Inc. (TW)

( * ) Notice: Subject to any disclaimer, the term of this patent is extended or adjusted under 35 U.S.C. 154(b) by 0 days.

(21) Appl. No.: 13/024,470

(22) Filed: Feb. 10, 2011

(65) Prior Publication Data

US 2012/0208040 A1 Aug. 16, 2012

(51) Int. Cl.
*H01G 4/005* (2006.01)

(52) U.S. Cl. .......... 361/306.1; 361/306.3; 361/308.1; 361/309; 252/514

(58) Field of Classification Search .......... 361/306.1, 361/306.3, 308.1, 309; 252/514
See application file for complete search history.

(56) References Cited

U.S. PATENT DOCUMENTS

| | | | | |
|---|---|---|---|---|
| 3,612,963 A * | 10/1971 | Piper et al. | | 361/321.3 |
| 4,811,162 A * | 3/1989 | Maher et al. | | 361/308.1 |
| 5,021,921 A * | 6/1991 | Sano et al. | | 361/321.3 |
| 5,093,774 A * | 3/1992 | Cobb | | 361/306.3 |
| 5,963,416 A * | 10/1999 | Honda et al. | | 361/306.1 |
| 6,663,798 B2 * | 12/2003 | Sato et al. | | 252/512 |
| 6,673,272 B2 * | 1/2004 | Miyazaki et al. | | 252/507 |
| 6,704,189 B2 * | 3/2004 | Yoshii et al. | | 361/308.1 |
| 6,903,919 B2 * | 6/2005 | Kayatani et al. | | 361/321.2 |
| 6,927,966 B2 * | 8/2005 | Miyazaki et al. | | 361/321.2 |
| 6,965,167 B2 * | 11/2005 | Liu | | 257/777 |
| 7,047,635 B2 * | 5/2006 | Suetsugu et al. | | 29/840 |
| 7,558,047 B2 * | 7/2009 | Ukuma | | 361/305 |
| 7,751,174 B2 * | 7/2010 | Kimura et al. | | 361/306.3 |

* cited by examiner

*Primary Examiner* — Cathy Lam
(74) *Attorney, Agent, or Firm* — Bacon & Thomas, PLLC

(57) ABSTRACT

A multilayer ceramic device comprises a laminated ceramic body having opposite end surfaces, a pair of conductive electrodes each respectively attached to one end surface of the laminated ceramic body and a plurality of alternately staggered internal electrodes within the laminated ceramic body configured in an alternating manner and each electrically connected to the corresponding conductive electrodes respectively; each conductive electrodes of the multilayer ceramic device is further covered with a solder paste layer so that the multilayer ceramic device is thus made without any plating step and no need of treating waste liquid nickel or waste liquid tin as well as no problem of environmental pollution caused by plating solution, thereby lowering manufacturing costs and reducing processing time.

3 Claims, 2 Drawing Sheets

STRUCTURE OF MULTILAYER CERAMIC DEVICE

BACKGROUND OF THE INVENTION

1. Field of the Invention

The present invention relates to multilayer ceramic devices, and more particularly, to an improved structure related to external electrodes of a multilayer ceramic device, wherein the structure is made without both nickel plating and tin plating.

2. Description of Prior Art

Currently common multilayer chip passive devices include ceramic electronic devices such as multilayer ceramic capacitors (MLCCs), multilayer ceramic inductors (MLCIs), multilayer varistors (MLVs) and multilayer ceramic thermistors. Hereinafter, all these ceramic electronic devices are referred to as "multilayer ceramic devices".

Referring to FIG. 1, an existing multilayer ceramic device 10 comprises a laminated ceramic body 20 having opposite end surfaces and comprised of a plurality of dielectric layers, a pair of external electrodes 30 each respectively attached to one end surface of the laminated ceramic body 20 and a plurality of alternately staggered internal electrodes 40 within the laminated ceramic body 20 configured in an alternating manner and electrically connected to the corresponding external electrodes 30 respectively.

Traditionally, the external electrodes 30 of the multilayer ceramic device 10 are electrically attached to contacts provided on a circuit board. Thus, the external electrodes 30 of the multilayer ceramic device 10 have to possess good resistance to soldering heat, corrosion and oxidation.

For this purpose mentioned above, in the process for manufacturing the multilayer ceramic device 10, nickel plating and tin plating are necessarily performed to make the external electrode 30 have the layered structure composed of an innermost conduction electrode 31 made of silver, an intermediate nickel plated layer 32 and an outermost tin plated layer 33, wherein the intermediate nickel plated layer 32 servers as an intermediate shield to protect the silver-made conduction electrode 31. Due to the poor resistance to soldering heat of nickel, the intermediate nickel plated layer 32 has to be covered with the outermost tin plated layer 33 so as to be adequately resistant to soldering heat.

However, the plating steps for making the multilayer ceramic device 10 can cause toxic waste seriously polluting the environment.

As shown in FIG. 2, with the development of SMT (Surface Mount Technology), the multilayer ceramic device 10 is now available as a surface mount device (SMD). With SMT that has been mature, the multilayer ceramic device 10 can be directly placed on the circuit board 90 with beforehand glue or tin paste 95 and fixed to contacts of the circuit board 90 by melting the paste 95 with hot air or infrared rays to its melting point and then cooling it, so as not to involve any soldering step as required by the traditional process.

That is to say, the external electrodes 30 of the multilayer ceramic device 10 are attached to the circuit board 90 by means of SMT, without using the traditional soldering steps. Therefore, it is no more needed to provide the external electrodes 30 of the multilayer ceramic device 10 with extra resistance to soldering heat and corrosion by building the nickel plated layer 32 and tin plated layer 33 thereon.

SUMMARY OF THE INVENTION

In view of this, the primary objective of the present invention is to provide a multilayer ceramic device made without any plating step and thus without pollution to the environment.

To achieve the above objective, the multilayer ceramic device of the present invention comprises a laminated ceramic body having opposite end surfaces, a pair of conductive electrodes each respectively attached to one end surface of the laminated ceramic body and a plurality of alternately staggered internal electrodes within the laminated ceramic body configured in an alternating manner and electrically connected to the corresponding conductive electrode respectively, wherein each conductive electrode is covered with a solder paste layer.

According to the present invention, the conductive electrode of the multilayer ceramic device is an electrode layer made of silver, copper, silver alloy or copper alloy. Preferably, the conductive electrode is made of Ag/Pd alloy or Ag/Pt alloy that helps the solder paste layer to cover the conductive electrode.

According to the present invention, the solder paste layer of the multilayer ceramic device contains a soldering flux and one or more of tin powder, copper powder, tin-based alloy powder and copper-based alloy powder, all having a particle diameter of 1-5 μm, wherein the soldering flux takes 20-30% by volume.

According to the present invention, the multilayer ceramic device is made without any soldering step, thereby eliminating the need of treating waste liquid nickel and waste liquid tin, causing no environmental pollution, and having benefits of lowering manufacturing costs and reducing processing time.

BRIEF DESCRIPTION OF THE DRAWING

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

Figure 1:
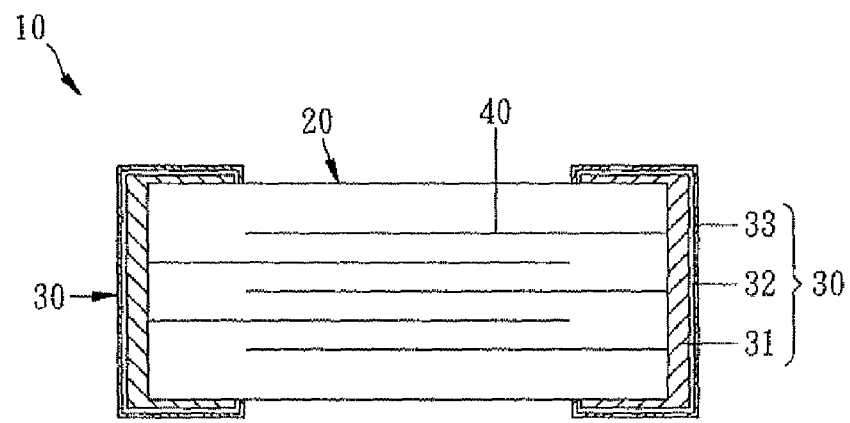
FIG. 1 is a cross-sectional view of a traditional multilayer ceramic device.
Figure 2:
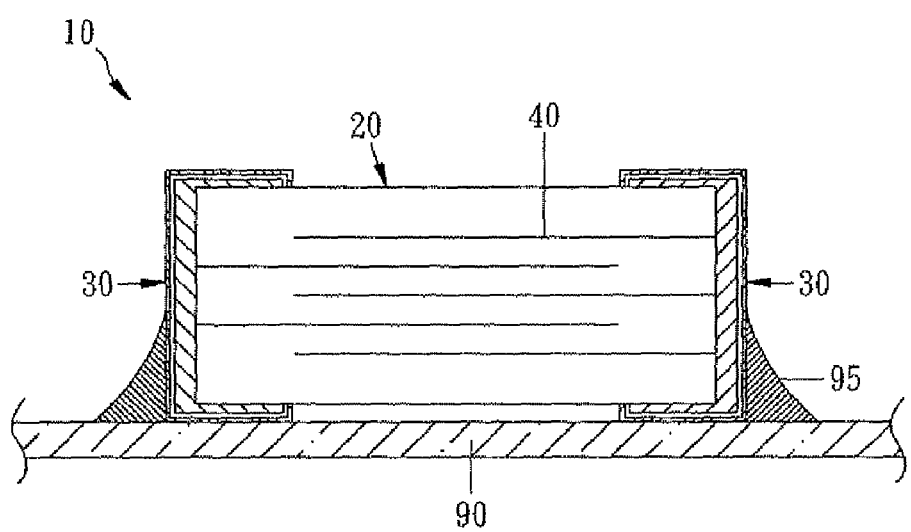
FIG. 2 is a schematic drawing showing that the multilayer ceramic device of FIG. 1 is fixed to a circuit board thorough tin paste provided on the circuit board.
Figure 3:
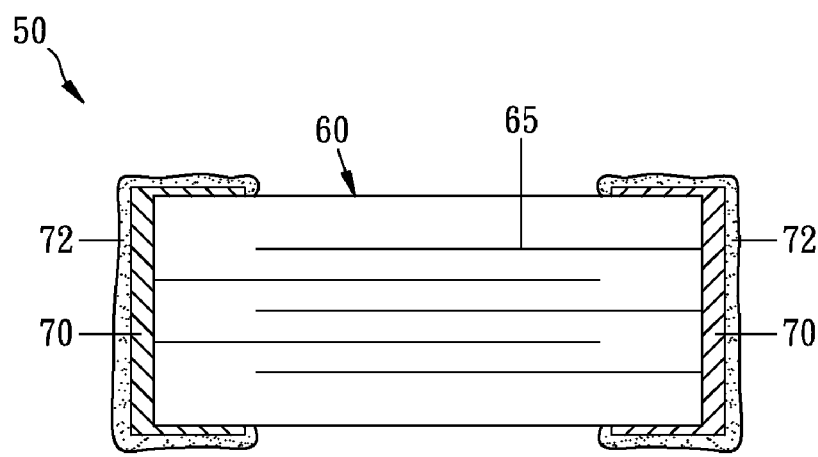
FIG. 3 is a cross-sectional view of a multilayer ceramic device of the present invention.

Referring to FIG. 3, according to the present invention, a multilayer ceramic device 50 is constructed to comprise a laminated ceramic body 60 having opposite end surfaces and comprised of a plurality of dielectric layers, a pair of conductive electrode 70 each respectively attached to one end surface of the laminated ceramic body 50 and further covered with an exposed layer of solder paste layer 72, and a plurality of alternately staggered internal electrodes 40 within the laminated ceramic body 60 configured in an alternating manner and electrically connected to the corresponding conductive electrode 70 respectively.

The conductive electrode 70 is an electrode layer made of silver, copper, silver alloy or copper alloy. Particularly, the conductive electrode 70 is preferably made of Ag/Pd alloy or Ag/Pt alloy. The ratio of silver and palladium (or silver and platinum) in the conductive electrode 70 made of Ag/Pd alloy or Ag/Pt alloy can be selected from various ratios, while it is preferable that the weight ratio of silver and palladium (or silver and platinum) is in the range of from 95:5 to 99:1. The select material helps the solder paste layer 72 to cover the conductive electrode 70.

The solder paste layer 72 is paste prepared from a soldering flux and one or more of tin powder, copper powder, tin-based alloy powder and copper-based alloy powder, all having a particle diameter of 1-5 μm. Meantime, for providing the solder paste layer 72 with proper viscosity, the soldering flux takes 20-30% in the total volume of the solder paste layer 72.

The solder paste layer 72 may be applied to the exposed surface of the conductive electrode 70 by means of dipping, printing or spraying or by using a tin soaking furnace.

For example, fine powder of Sn, Ag and Cu with a particle size of from 1 μm to 5 μm may be mixed in a Sn:Ag:Cu weight ratio of 94.5:5.0:0.5 and then mixed with a soldering flux to form viscid solder tin paste wherein the soldering flux is in the amount of 20-30% by volume of the solder tin paste. The solder tin paste such prepared is applied to the outer surface of each said conductive electrode 70 of the multilayer ceramic device 50 to form the solder paste layer 72, thus completing the improved structure of the multilayer ceramic device 50.

Figure 4:
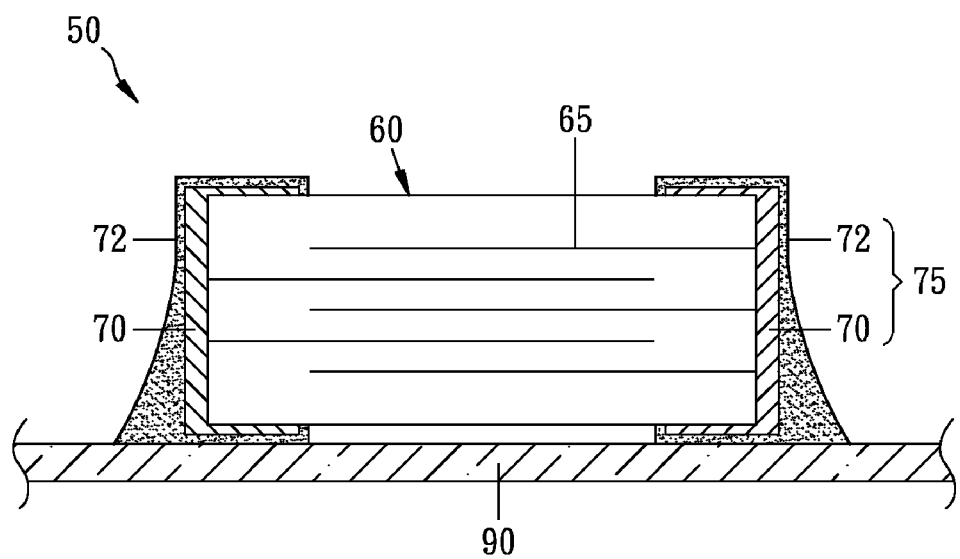
FIG. 4 is a schematic drawing showing that the multilayer ceramic device of FIG. 3 is fixed to a circuit board thorough its own solder paste layers.

As shown in FIG. 4, since the multilayer ceramic device 50 of the present invention comes with the viscid solder paste layer 72, there is no need to additionally provide the circuit board 90 with glue or tin paste. The multilayer ceramic device 50 of the present invention can be directly placed on contacts of the circuit board 90 and fixed to contacts of the circuit board 90 by melting the solder paste layer 72 with hot air or infrared rays to its melting point and then cooling it.

Thereby, the cured solder paste layer 72 and the conductive electrode 70 jointly form an external electrode 75 of the multilayer ceramic device 50.

The disclosed multilayer ceramic device 50 is thus made without any plating step and no need of treating waste liquid nickel or waste liquid tin as well as no problem of environmental pollution caused by plating solution, thereby lowering manufacturing costs and reducing processing time.

What is claimed is:

1. A structure of a multilayer ceramic device, comprising:
a laminated ceramic body having opposite end surfaces;
a pair of conductive electrodes each made of silver, copper, silver alloy, copper alloy, Ag/Pd alloy or Ag/Pt alloy and respectively attached to each one of the end surfaces of the laminated ceramic body; and
a plurality of alternately staggered internal electrodes within the laminated ceramic body configured in an alternating manner and each electrically connected to the corresponding conductive electrodes respectively;
wherein the improvement comprising each conductive electrode is covered with a viscid solder paste layer which composition comprises a soldering flux 20-30% by volume of the viscid solder paste layer and one or more powder selected from the group consisting of tin powder, copper powder, tin-based alloy powder and copper-based alloy powder, all having a particle diameter of 1-5 μm.

2. The structure of a multilayer ceramic device of claim 1, wherein the weight ratio of silver and palladium in the Ag/Pd alloy is in the range of from 95:5 to 99:1.

3. The structure of a multilayer ceramic device of claim 1, wherein the weight ratio of silver and platinum in the Ag/Pt alloy is in the range of from 95:5 to 99:1.

* * * * *